United States Patent

Senoo et al.

[15] 3,674,851

[45] July 4, 1972

[54] PROCESS FOR THE PREPARATION OF ALIPHATIC TERTIARY AMIDES

[72] Inventors: Saburo Senoo; Yohei Fukuoka; Katuyoshi Sasaki, all of Tokyo, Japan

[73] Assignee: Asahi Kasei Kogyo Kabushiki Kaisha, Osaka, Japan

[22] Filed: March 31, 1970

[21] Appl. No.: 24,368

[30] Foreign Application Priority Data

April 2, 1969 Japan..................................44/24831
April 2, 1969 Japan..................................44/24832
April 2, 1969 Japan..................................44/24833

[52] U.S. Cl. .......................................................260/561 R
[51] Int. Cl. .........................................................C07c 103/00
[58] Field of Search ..............................................260/561 R

[56] References Cited

UNITED STATES PATENTS 2,204,371  6/1940  Loder.....................................260/561
3,133,094  5/1964  Schickh.............................260/404.5

OTHER PUBLICATIONS

Pattison, Fatty Acids and Their Industrial Applications, Marcel Dekker, Inc., N.Y., 1968, page 82

Primary Examiner—Lewis Gotts
Assistant Examiner—Ethel G. Love
Attorney—Irons, Sears, Staas, Halsey & Santorelli

[57] ABSTRACT

This invention discloses a process for the preparation of aliphatic tertiary amides which comprises reacting a fatty acid represented by the general formula $R^1COOH$ wherein $R^1$ is a hydrogen atom or an alkyl group having one to six carbon atoms and ammonia directly with an alcohol represented by the general formula $R^2OH$ wherein $R^2$ is an alkyl group having one to four carbon atoms at a temperature of 100° C. to 800° C. under pressure, said ammonia and alcohol being employed in amounts of 0.8 to five moles and 1.5 to ten moles per mole of fatty acid, respectively. In this process, there may be additionally employed a catalyst to accelerate the rate of reaction. Also, in this invention all or part of starting materials remaining unreacted and/or by-products may be recycled to the starting reaction mixture, thereby enabling the yield of the desired aliphatic tertiary amides to be remarkably improved. In addition, the removal of the water which is produced during the course of reaction assists the present process to be further improved. Thus, according to the present invention, aliphatic tertiary amides can be simply produced with excellent yields from the raw materials which are readily available at low cost, as opposed to the conventional process employing as a starting material dialkylamines which are difficult to obtain in the purified form.

7 Claims, No Drawings

PROCESS FOR THE PREPARATION OF ALIPHATIC TERTIARY AMIDES

This invention relates to a process for the preparation of aliphatic tertiary amides, and more particularly to a process for the preparation of aliphatic tertiary amides which comprises reacting a fatty acid and ammonia directly with an alcohol.

Aliphatic tertiary amides are industrially important compounds which are useful as solvents for various purposes such as extraction and reaction media. Examples of these important aliphatic tertiary amides include N,N-dimethylacetamide, N,N-dimethylformamide and N,N-diethylformamide. However, the conventional manufacturing process for the preparation of aliphatic tertiary amides are expensive, leading to a restriction on the use of the aliphatic tertiary amides in industry.

Heretofore, it has been proposed to prepare aliphatic tertiary amides by the reaction of a fatty acid with a dialkylamine. According to this conventional process, aliphatic tertiary amides can advantageously be prepared from a fatty acid which is readily obtainable at low cost. However, a dialkylamine, which is employed as another raw material of this conventional process, is produced by reacting an alcohol with ammonia at elevated temperature under high pressure. The production of dialkylamines by such a process is inevitably accompanied by the formation of monoalkylamines and trialkylamines. The respective boiling points of these amines are close to one another, thus rendering difficult the separation and purification of mixtures of these amines. Therefore, purified dialkylamines are expensive as compared with the amine mixtures. For example, diamethylamine, which is employed as raw material for the preparation of N,N-dimethylformamide and N,N-dimethylacetamide, is produced by reacting ammonia with methanol at elevated temperature under high pressure. The production of dimethylamine by such a process is accompanied by the formation of monomethylamine and trimethylamine. The produced monomethylamine (boiling point: −6° C.), dimethylamine (boiling point: +7° C.) and trimethylamine (boiling point: +4° C.) are separated by distillation. But, since the respective boiling points of them are close to one another and, in addition, are low, the separation and purification of these amines require additional many processes, resulting in high cost of the desired dimethylamine. Therefore, the proposed method for the preparation of aliphatic tertiary amines, which requires purified dialkylamines as raw material, is uneconomical.

As a result of the intensive study by the present inventors, it has now been found that aliphatic tertiary amides can be prepared, without employing as raw materials dialkylamines which are difficult to obtain in the purified form, by the direct reaction between a fatty acid, ammonia and an alcohol. The present invention has been made on the basis of such novel finding.

Therefore, it is an object of the present invention to provide a process for preparing aliphatic tertiary amides which can be simply carried out using the starting materials which are readily available at low cost as raw materials for synthesis, thereby enabling aliphatic tertiary amides to be manufactured at low cost.

The present invention consists in the direct reaction between a fatty acid represented by the general formula $R^1COOH$ wherein $R^1$ is a hydrogen atom or an alkyl group having one to six carbon atoms, ammonia and an alcohol represented by the general formula $R^2OH$ wherein $R^2$ is an alkyl group having one to four carbon atoms.

The process of the present invention employs, as raw materials, a fatty acid, ammonia and an alcohol which are readily available at low cost. Furthermore, the present process can be carried out as a one-stage process as opposed to the previously proposed process employing a dialkylamine in which the dialkylamine is produced by the reaction of ammonia with an alcohol at elevated temperature under high pressure and the subsequent purification thereof and then reacted with a fatty acid. Thus, a considerable simplification of the process as well as a reduction in the cost of the manufacture of the aliphatic tertiary amides is achieved. Therefore, the process of this invention is greatly valuable in the industry. For instance, by the direct reaction between a fatty acid e.g. formic acid or acetic acid, an alcohol e.g. methanol or ethanol and ammonia, the following corresponding aliphatic tertiary amides may be readily obtained: N,N-dimethylformamide, N,N-diethylformamide, N,N-dimethylacetamide, and N,N-diethylacetamide. Moreover, it is to be noted that the boiling points of these desired products are so different from those of the by-products that the products can be easily separated and purified.

The fatty acids which are employed in the process of this invention are suitably those of the general formula $R^1COOH$ wherein $R^1$ is a hydrogen atom or an alkyl group having one to six carbon atoms. Examples of such fatty acids embrace formic acid, acetic acid, propionic acid, n-butyric acid, isobutyric acid, n-valeric acid, trimethylacetic acid, caproic acid and n-heptanoic acid. The alcohols used in the process of this invention are suitably those of the general formula $R^2OH$ wherein $R^2$ is an alkyl group having one to four carbon atoms and examples of such alcohols are methyl alcohol, ethyl alcohol, n-propyl alcohol, isopropyl alcohol, n-butyl alcohol and isobutyl alcohol.

In carrying out the process of this invention, the starting materials, namely the fatty acid, ammonia and the alcohol may each be employed from the beginning of the reaction in the full amount required for the desired reaction, or may be successively or stepwise supplied during the course of the reaction. Ammonia is suitably employed in an amount ranging from 0.8 to five moles, more preferably from one to four moles per mole of fatty acid. In this connection, it is noted that when ammonia is employed in amount of one mole per mole of fatty acid, an ammonium salt of fatty acid which is readily available in commerce may be advantageously used instead. The alcohol is suitably employed in an amount ranging from 1.5 to ten moles per mole of fatty acid. When an insufficient amount of alcohol is employed, the undesirable formation of N-monoalkylamides as a by-product is promoted, and the use of too much alcohol also has an adverse effect on the reaction, that is, the rate of reaction is depressed and, at the same time, the formation of trialkylamies as a by-product is unfavorably promoted. Therefore, the amount of alcohol ranging from two to eight moles per mole of fatty acid is most preferable.

As described, since aliphatic tertiary amides can be produced by the direct reaction between a fatty acid, ammonia and an alcohol in the absence of a catalyst, the process of the present invention is very advantageous. While, the process of this invention may be carried out in the presence of a catalyst with more advantage. The use of a catalyst accelerates the rate of reaction greatly and thus enables the process to be rapidly completed, and, at the same time, depresses the formation of by-products, thereby improving the yield of the desired product and enabling the separation and the purification to be easily effected. For this reason, the use of a catalyst in the process is effective. The catalysts for use in the process of the present invention may be selected from the group consisting of inorganic acid salts and organic acid salts of copper, zinc, cadmium, mercury, titanium, zirconium, tin, lead, vanadium, antimony, bismuth, chromium, manganese, iron, cobalt, nickel, ruthenium, rhodium and palladium, and may be employed alone or in mixture thereof.

Particularly suitable inorganic acid salts of the above-mentioned metals are, for example, salts of carbonic acid, hydrogen cyanide, nitric acid, sulfuric acid, hydrogen halide, phosphoric acid, pyrophosphoric acid, boric acid, nitrous acid, sulfurous acid, phosphorous acid, thiocyanic acid, and hydrogen oxyhalides such as hypochlorous acid, chloric acid and perchloric acid. Suitable organic acid salts of the above-mentioned metals are, for example, salts of formic acid, acetic acid, propionic acid, butyric acid, stearic acid, oxalic acid, citric acid, p-toluenesulfonic acid, picric acid, napthenic acid, benzoic acid and toluic acid.

The catalyst may be employed in the form of a solution or a suspension in the reaction system, or there may be employed the catalyst carried by silica gel or alumina. The amount of the catalyst may vary widely, e.g. from 0.0001 to ten mole percent, more preferably from 0.01 to five mole percent, based on the amount of fatty acid. It is undesirable to employ too small amount of a catalyst since no catalytic effect may be obtained and the rate of reaction may not be improved. On the other hand, it is also undesirable to employ a greatly increased amount of a catalyst, since it is not followed by a corresponding improvement in catalytic effect but rather has a detrimental influence on the subsequent operation for isolating and purifying the desired product.

The process of the present invention can be carried out in the gaseous or liquid phase. The reaction temperature employed is suitable from 100° to 800° C. In view of the fact that the lower the temperature, the slower the rate of reaction, while at too high temperatures the side reaction is promoted to form an undue amount of by-product, leading to a decreased yield of the desired aliphatic tertiary amide, the temperature from 150° to 500° C. is more preferably employed. The reaction mixture obtained by the process of the present invention includes raw materials remaining unreacted and by-products in addition to the desired aliphatic tertiary amide, and the yield of the desired product is not so high. As a result of the further investigation by the present inventors to eliminate this drawback, however, it has been found that by the addition of some or all of these raw materials remaining unreacted and by-products to the starting reaction mixture including a fatty acid, ammonia and an alcohol, the yield of the aliphatic tertiary amide may be greatly improved. For this reason, in the large-scale conduct of the process of the present invention, it is particularly advantageous to recycle some or all of the raw materials remaining unreacted and by-products to the reaction mixture. Stated illustratively, the reaction mixture obtained by the process of the present invention comprises raw materials remaining unreacted and many kinds of by-products which include the primary amide, secondary amide, trialkylamine, fatty acid ester, water and the unknowns in addition to the desired aliphatic tertiary amide. By adding or recycling these raw materials remaining unreacted and by-products to the starting reaction system, the yield of the desired aliphatic tertiary amide in relation to the amounts of fatty acid, ammonia and alcohol employed may advantageously be improved. Moreover, it is to be noted that by further adding or recycling the unreacted starting materials and by-products which are obtained in the first recycling stage to the reaction system of the succeeding time in the same manner as in the first recycling stage, the same effect can be obtained, and this recycling operation can be repeated without restriction on the number of times to give the same effect every time. When the process of the present invention is carried out in the presence of a catalyst, the by-products recycled assist the solubility of the catalyst to be increased, thereby remarkably improving the catalytic effect.

For exemplifying the effect of such recycling, the illustration will be made on the reaction between acetic acid, ammonia and methanol. In this reaction, N,N-dimethylacetamide is obtained as a desired product, and, at the same time, the unreacted raw materials and a number of kinds of by-products are obtained. The desired product is obtained in poor yield as low as 20 to 50 percent based on the amount of acetic acid employed. However, by adding or recycling the unreacted raw materials and by-products to the starting reaction system, the yield of the desired product is improved up to higher than 95 percent based on the amount of acetic acid employed.

On the other hand, the removal of the water, which is produced during the course of the reaction, out of the reaction system is effective for not only increasing the rate of the convertion from a fatty acid to the corresponding aliphatic tertiary amide to decrease the rate of the remain of fatty acid but also depressing the reverse reaction. Aliphatic tertiary amides generally cooperate with the corresponding fatty acids to form azeotropic mixtures, which are hardly fractionally distilled (for example, the boiling point of acetic acid, 118.2° C./750mmHg; the boiling point of dimethylacetamide, 165.6° C./760mmHg, the azeotropic point of the mixture which comprises 77.2 percent by weight of dimethylacetamide and 21.1 percent by weight of acetic acid is 170.8° C.). Therefore, the removal of the water out of the reaction system, which causes the rate of the remain of fatty acid to be decreased, leads to a remarked advantage in the separation and purification of aliphatic tertiary amides. The removal of water is particularly effective when the above-mentioned recycling operation is conducted. In order to remove water, such operation may be employed that the reaction mixture is subjected to fractional distillation batchwise in the course of reaction to separate a water fraction from the fractions having low boiling points, whereupon the fractions having low boiling points are returned to the reaction system followed by heating. Alternatively, the water may be removed successively, as controlling the reaction pressure and temperature.

As described, according to the present invention, there is provided a process for the preparation of aliphatic tertiary amides which is simple to carry out as opposed to the conventional process employing dialkylamines which are difficult to obtain in the purified form. In addition, by recycling the raw materials remaining unreacted and by-products and/or removing the water which is produced during the course of the reaction, the desired aliphatic tertiary amides can be prepared in high yield. Thus, the present manufacturing process for the preparation of aliphatic tertiary amides are extremely valuable in the industry.

The following examples are given by way of illustration of the invention.

EXAMPLE 1

77.0 G. of ammonium acetate, 64 g. of methanol and 4.8 g. of cobalt chloride were charged into an induction revolving stirring type autoclave (hereinafter referred to simply as an autoclave) with a capacity of 500ml. and, after replacement of the air in the autoclave by nitrogen, were heated at 360° C. for 2 hours. On opening the autoclave the portions of the reaction mixture having low boiling points were removed by distillation under normal pressure. Subsequent distillation give 30.5 g. of N,N-dimethylacetamide boiling at 163° to 165° C. under normal pressure. Its infrared absorption spectrum exhibited an absorption due to an amido group at $\nu$ max, 1640cm$^{-1}$.
Elementary analysis:

|  | Found | Calcd. |
|---|---|---|
| C% | 54.78 | 55.14 |
| H% | 10.21 | 10.41 |
| N% | 16.20 | 16.08 |

In this reaction, 18.6 g. of acetic acid were recovered. The yield of N,N-dimethylacetamide in the reaction was 50.7 percent based on the consumed amount of acetic acid.

EXAMPLE 2

77.0 G. of ammonium acetate and 64.0 g. of methanol were allowed to react at 360° C. for 2 hours in the same manner as described in Example 1. After subsequently treating similarly as in Example 1, 25.9 g. of N,N-dimethylacetamide were obtained (the yield based on the amount of charged acetic acid was 29.8 percent).

EXAMPLE 3

60.0 G. of acetic acid, 17.0 g. of ammonia, 71.0 g. of methanol, and 2.7 g. of zinc chloride were charged into an autoclave with a capacity of 300ml. and after replacement of the air in the autoclave by nitrogen, were heated at 350° C. for 1 hour while agitating. After cooling to room temperature, the autoclave was opened to get the reaction mixture. After removing the portions of the reaction mixture having low boiling points under normal pressure, the remaining portion was subjected to distillation under reduced pressure to give 34.8 g.

of N,N-dimethylacetamide (the yield based on the amount of acetic acid was 40.0 percent). The boiling point of the thus obtained N,N-dimethylacetamide was 106° to 110° C./90mmHg. Subsequent distillation gave 28.5 g. of a fraction boiling at 138° to 170° C./90mmHg. Together with all these 5 fractions, 60.0 g. of acetic acid, 17.0 g. of ammonia, 71.0 g. of methanol, and 2.7 g. of zinc chloride were charged into an autoclave having a capacity of 300ml. and, after replacement of the air in the autoclave by nitrogen, were heated at 350° C. for 1 hour with stirring. The portions of the reaction mixture having lower boiling points were removed from the obtained reaction mixture under normal pressure. Subsequent distillation under reduced pressure gave 63.0 g. of N,N-dimethylacetamide (the yield based on the amount of acetic acid was 71.6 percent).

EXAMPLE 4

In the same manner as described in Example 1, 77.0 g. of ammonium acetate, 57.0 g. of methanol, and 6.7 g. of cupric bromide were charged and allowed to first react at 280° C. for 3 hours. The resulting reaction mixture was subjected to distillation under normal pressure to remove the portions of the reaction mixture having lower boiling points. There were obtained 24.8 g. of N,N-dimethylacetamide (the yield based on the amount of acetic acid was 28.5%). The distillation was stopped and then, the obtained portions of the reaction mixture having lower boiling points were put together with the residue remaining in the distillation vessel, into which 38.5 g. of ammonium acetate and 31.0 g. of methanol, which are both the same as the raw materials, were charged. The mixture was allowed to secondly react at 280° C. for 3 hours in the above-described autoclave to give 32.0 g. of N,N-dimethylacetamide (the yield based on the amount of charged acetic acid was 73.5 percent). 9.6 G. of unreacted acetic acid (25 percent based on the amount of charged acetic acid) were recovered (thus, the yield based on the consumed amount of acetic acid was 98.5 percent).

EXAMPLE 5

In the same manner as described in Example 3, 7.7 g. of ammonium acetate, 7.0 g. of methanol and each of the catalysts shown in Table 1 in an amount of five mole percent based on the amount ammonium acetate were charged, and then reacted at 320° C. for two hours. The resulting reaction mixture was subjected to distillation. The yields of distilled N,N-dimethylacetamide are summarized in the same Table 1. Further, the fractions having boiling points either lower or higher than that of N,N-dimethylacetamide were put together with each other, to which 7.7 g. of ammonium acetate and 7.0 g. of methanol which are both the same raw materials and each of the catalysts shown in Table 1 in an amount of five mole percent based on the amount of ammonium acetate were added. Then, the second reaction was carried out at 320° C. for two hours. The resulting reaction mixture was post-treated in the same manner as described above. The yields of the produced N,N-dimethylacetamide are summarized in Table 1.

TABLE 1

| Catalyst | Yield (g.) | |
|---|---|---|
| | First | Second |
| Nil | 2.4 | 5.2 |
| Copper p-toluenesulfonate | 3.1 | 8.2 |
| Copper n-butylate | 3.5 | 8.1 |
| Copper acetate | 3.4 | 8.2 |
| Copper benzoate | 3.5 | 8.3 |
| Copper borate | 3.0 | 7.5 |
| Copper fluoride | 3.1 | 7.8 |
| Copper formate | 3.6 | 7.9 |
| Cupric oxychloride | 3.8 | 8.2 |
| Copper phosphate | 3.5 | 8.1 |
| Copper pyrophosphate | 3.2 | 7.5 |
| Copper stearate | 3.5 | 7.9 |
| Cuprous chloride | 3.8 | 8.2 |
| Antimony oxychloride | 3.2 | 8.1 |
| Antimony sulfate | 2.9 | 7.8 |
| Bismuth nitrate | 2.9 | 7.9 |
| Bismuth oxalate | 3.2 | 7.0 |
| Ruthenium chloride | 3.2 | 7.5 |
| zirconium oxychloride | 2.9 | 7.8 |
| Titanium trichloride | 2.9 | 7.6 |
| Stannous nitrite | 2.8 | 7.2 |
| Stannic nitrite | 3.0 | 7.0 |
| Lead phosphate | 2.8 | 7.1 |
| Antimony chloride | 3.1 | 8.3 |
| Chromium chloride | 3.3 | 8.2 |
| Chromium stearate | 3.3 | 8.1 |
| Chromic acetate | 3.4 | 7.5 |
| Chromium oxalate | 3.3 | 7.3 |
| Manganese chloride | 3.4 | 7.9 |
| Ferric chloride | 4.0 | 8.4 |
| Cobalt chloride | 3.9 | 8.3 |
| Nickel chloride | 3.9 | 7.9 |
| Rhodium chloride | 3.6 | 7.9 |
| Palladium chloride | 3.2 | 8.1 |
| Bismuth citrate | 3.2 | 7.5 |
| Bismuth oxybromide | 3.6 | 7.6 |
| Bismuth phosphate | 3.2 | 7.2 |
| Bismuth benzoate (basic) | 3.3 | 7.9 |
| Bismuth carbonate (basic) | 3.1 | 7.1 |
| Bismuth acetate (basic) | 3.3 | 7.4 |
| Nickel carbonate | 3.6 | 8.1 |
| Nickel cyanide | 3.1 | 7.3 |
| Nickel benzoate | 3.8 | 7.2 |
| Nickel acetate | 3.3 | 8.3 |
| Nickel formate | 3.8 | 8.2 |
| Nickel naphthenate | 3.2 | 7.9 |
| Nickel nitrate | 3.5 | 7.2 |
| Nickel phosphate | 3.4 | 7.8 |
| Nickel sulfate | 3.3 | 7.8 |
| Nickel thiocyanate | 3.1 | 7.0 |

EXAMPLE 6

In the same manner as described in Example 3, 4.6 g. of formic acid, 1.9 g. of ammonia, 7.0 g. of methanol and each of the catalysts shown in Table 2 in an amount of five mole percent based on the amount of formic acid were charged into an autoclave with a capacity of 20 ml., reacted at 170° C. for 48 hours and then, post-treated similarly as described in Example 3. There was produced N,N-dimethylformamide with the yields as summarized together with the catalysts as shown in the same Table 2. The fractions of the reaction mixture having boiling points either higher or lower than that of N,N-dimethylformamide were put together with the residue in the distillation vessel, to which 7.7 g. of ammonium acetate and 7.0 g. of methanol which are both the same as raw materials and each of the catalyst shown in Table 2 in an amount of five mole percent based on the amount of ammonium acetate were added. Then, the second reaction was allowed to proceed at 320° C. for two hours. The yields of N,N-dimethylformamide produced in the second reaction are also shown in Table 2.

TABLE 2

| Catalyst | Yield (g.) | |
|---|---|---|
| | First | Second |
| Nil | 1.5 | 3.5 |
| Cupric chloride | 2.6 | 4.8 |
| Cupric cyanide | 2.0 | 4.2 |
| Cupric bromide | 2.5 | 4.5 |
| Ferric chloride | 3.1 | 5.1 |
| Ferric citrate | 2.8 | 5.0 |
| Ferric formate (basic) | 3.0 | 4.9 |
| Ferric acetate | 3.1 | 5.3 |
| Ferric stearate | 2.9 | 5.2 |
| Ferric naphthenate | 3.1 | 5.3 |
| Ferric oxalate | 2.6 | 4.9 |
| Ferric phosphate | 2.8 | 5.4 |
| Ferric pyrophosphate | 2.6 | 5.1 |
| Ferric sulfate | 2.5 | 5.3 |
| Ferric thiocyanate | 2.4 | 5.2 |
| Cobalt chloride | 3.0 | 4.9 |
| Cobalt naphthenate | 2.2 | 5.2 |
| Cobalt toluylate | 2.0 | 5.1 |
| Cobalt acetate | 2.5 | 5.4 |

| | | |
|---|---|---|
| Cobalt oxalate | 2.2 | 4.8 |
| Cobalt bromide | 2.4 | 4.9 |

EXAMPLE 7

In the same manner as described in Example 3, 6.0 g. of acetic acid, 1.9 g. of ammonia, 7.0 g. of methanol, and each of the catalysts shown in Table 3 in an amount of two mole percent based on the amount of acetic acid were charged into an autoclave having the capacity of 200 ml. and then, reacted at 400° C. for 20 minutes. The resulting reaction mixture was treated in the same manner as described in Example 3. The yield of the produced N,N-dimethylacetamide with each catalyst is shown in the same Table 3. The fractions having boiling points higher than that of N,N-dimethylacetamide and the residue in the distillation vessel were put together. To the obtained mixture 6.0 g. of acetic acid, 1.9 g. of ammonia, 7.0 g. of methanol and each of the catalysts shown in Table 3 in an amount of two mole percent based on the amount of acetic acid were added, and reacted at 400° C. for 20 minutes. The resulting reaction mixture was treated in the same manner as above. The yields of N,N-dimethylacetamides obtained in the second treatment are also shown in the same Table 3. The fractions of the reaction mixture having boiling points higher than that of N,N-dimethylacetamide secondly obtained and the residue in the distillation vessel were put together, to which 6.0 g. of acetic acid, 1.9 g. of ammonia, 7.0 g. of methanol and each of the catalysts shown in Table 3 in an amount of two mole percent based on the amount of acetic acid were added. The resulting mixture was reacted at 400° C. for 20 minutes and treated in the same manner as described previously. The yields of the obtained N,N-dimethylacetamide are shown in the same Table 3.

TABLE 3

| Catalyst | Yield (g.) | | |
|---|---|---|---|
| | First | Second | Third |
| Nil | 2.0 | 4.1 | 4.5 |
| Cupric carbonate | 2.3 | 4.8 | 5.4 |
| Cupric sulfite | 2.5 | 5.0 | 5.8 |
| Cupric phosphite | 2.3 | 5.1 | 6.2 |
| Stannic phosphate | 2.6 | 5.4 | 5.8 |
| Stannic cyanide | 2.8 | 5.1 | 5.7 |
| Stannic borate | 2.3 | 4.9 | 5.1 |
| Stannic pyrophosphate | 2.7 | 5.3 | 5.7 |
| Stannic nitrite | 2.3 | 5.2 | 5.6 |
| Stannic chloride | 3.8 | 6.2 | 6.3 |
| Stannic thiocyanate | 2.8 | 4.8 | 5.2 |
| Stannous propionate | 3.3 | 4.9 | 6.1 |
| Stannous stearate | 3.2 | 5.4 | 5.4 |
| Cobalt naphthenate | 3.2 | 5.9 | 6.6 |
| Cobalt toluylate | 3.3 | 6.2 | 7.0 |
| Cobalt picrate | 2.9 | 5.4 | 5.2 |
| Cobalt butylate | 3.2 | 6.5 | 6.4 |
| Ferrous chloride | 3.6 | 6.1 | 6.8 |
| Zinc acetate | 3.1 | 5.6 | 5.9 |
| Zinc sulfate | 2.5 | 5.3 | 5.3 |
| Zinc nitrate | 2.7 | 5.1 | 5.5 |
| Cadmium chloride | 2.9 | 5.5 | 5.4 |
| Cadmium carbonate | 2.7 | 5.6 | 5.6 |
| Cadmium chlorate | 3.1 | 5.2 | 6.0 |
| Cadmium formate | 3.1 | 6.0 | 6.2 |
| Cadmium sulfate | 2.6 | 5.2 | 5.1 |
| Mercuric thiocyanate | 2.5 | 5.4 | 5.9 |
| Mercuric acetate | 2.7 | 5.1 | 5.4 |
| Mercuric stearate | 2.9 | 5.4 | 5.8 |
| Mercuric oxalate | 3.0 | 5.3 | 5.9 |
| Mercuric phosphate | 2.5 | 5.5 | 5.5 |
| Vanadium dichloride | 2.9 | 5.8 | 5.7 |
| Cupric chloride | 2.8 | 5.2 | 5.6 |
| 0.1 mole percent of— Manganese sulfite Mercuric chloride | 2.8 | 5.5 | 5.5 |
| 0.05 mole percent of— Manganese pyrophosphate Manganese acetate Palladium chloride Palladium sulfate | 2.6 | 5.9 | 5.8 |
| 0.01 mole percent of— Ferrous sulfate Ferric chloride | 3.0 | 6.0 | 6.1 |

EXAMPLE 8

In the same manner as described in Example 1, 77.1 g. of ammonium acetate, 148 g. of n-butyl alcohol and 4.8 g. of cobalt bromide were charged into an autoclave having a capacity of 500 ml. and then, reacted at 280° C. for 3 hours. The resulting reaction mixture was treated in the same manner as described in Example 1 to give 49.0 g. of N,N-di-n-butylacetamide.

The boiling point of the obtained N,N-di-n-butyl-acetamide was 115° to 116° C./90mmHg and its infrared absorption spectrum exhibited an absorption due to an amido group at ν max, 1640cm$^{-1}$.

Elementary analysis:

| | Found | Calcd. |
|---|---|---|
| C% | 69.75 | 70.12 |
| H% | 12.30 | 12.36 |
| N% | 8.21 | 8.12 |

In the post-treatment, the fractions of the reaction mixture having the boiling points either higher or lower than that of N,N-di-n-butylacetamide and the residue in the distillation vessel were put together (the total being 162.5 g.). To the resulting mixture 77.1 g. of ammonium acetate, 148 g. of n-butyl alcohol, and 4.8 g. of cobalt bromide were added, which were charged into an autoclave having a capacity of 500 ml. The mixture was reacted at 280° C. for 3 hours followed by the similar post-treatment to yield 88.5 g. of N,N-di-n-butylacetamide.

EXAMPLE 9

In the same manner as described in Example 1, 13.3 g. of ammonium caproate, 6.4 g. of methanol and 0.5 g. of copper naphthenate were charged into an autoclave having a capacity of 30 ml. and then, reacted at 300° C. for two hours. The reaction mixture was then subjected to the similar post-treatment to yield 5.2 g. of N,N-dimethylcaporonamide. On the other hand, in the post-treatment, the fractions of the reaction mixture having boiling points higher than that of N,N-di-n-butylacetamide and the residue in the distillation vessel were put together (the total being 6.4 g.), to which 13.3 g. of ammonium caproate, 6.4 g. of methanol and 0.5 g. of copper naphthenate were added. The reaction and post-treatment were carried out in the same manner as described previously. 9.3 G. of N,N-dimethylcapronamide were obtained.

EXAMPLE 10

To the mixture of the fractions having low boiling points and the distillation residue which were obtained according to the first reaction in Example 4 was added a mixture of 38.5 g. of ammonium acetate and 32.0 g. of methanol. The resulting mixture was continuously supplied into a stainless steel-made reactor (with an inner diameter of 5mm, a length of 10m and a capacity of 200 ml.) immersed in a salt bath (consisting of sodium nitrite and potassium nitrate in a ratio of one to one by weight) kept at 350° C. The reaction system was maintained at a pressure enough to keep the reaction mixture in a liquid phase. The mixture was supplied with a rate of 7.2 ml./min. The reaction mixture was cooled immediately after passing the reaction tube and discharged. The thus discharged reaction mixture was subjected to distillation to obtain 4.2 g. of unreacted acetic acid and 38.5 g. of N,N-dimethylacetamide (yield based on the amount of acetic acid, 88.3 percent; selectivity, 95.3 percent).

EXAMPLE 11

63.0 G. of ammonium formate, 66.0 g. of methanol, and 1.5 g. of ferric chloride as catalyst were reacted at 240° C. for 1 hour in the same manner as described in Example 1. Portions having low boiling points were removed from the resulting reaction mixture under normal pressure and then, the reaction mixture was subjected to distillation under reduced pressure to yield 21.6 g. of N,N-dimethylformamide (the yield based on the amount of formic acid was 29.6 percent). The boiling point of the thus obtained N,N-dimethylformamide was 88° to 92° C./90mmHg. Further continuous distillation gave 40.5 g. of a fraction having a boiling point of 127° to 155°C./ 90mmHg. To this fraction, 63.0 g. of ammonium formate, 66.0 g. of methanol and 1.5 g. of ferric chloride were added, charged into an autoclave and then, heated at 240° C. for one hour with agitation. The resulting reaction mixture was subjected to distillation to yield 45.7 g. of N,N-dimethylformamide (the yield based on the amount of formic acid was 62.6 percent).

EXAMPLE 12

77.0 G. of ammonium acetate, 68.0 g. of methanol and 2.5 g. of stannic chloride were charged into an autoclave having a capacity of 300ml. and, after replacement of the air in the autoclave by nitrogen, the charged mixture was heated with agitation at 340° C. for one hour. After cooling to room temperature, the autoclave was opened, and the obtained reaction mixture was subjected to distillation at normal pressure to yield 24.3 g. of fractions boiling at temperature lower than 100° C. By further continuous distillation 35.0 g. of water were obtained and then, distillation was stopped.

The obtained fractions having low boiling points and the residue of distillation were put together, charged into the above-mentioned autoclave and then, heated with agitation at 340° C. for one hour. After cooling to room temperature the autoclave was opened. The resulting reaction mixture was subjected to distillation under normal pressure, whereupon fractions having low boiling points and a small amount of water were removed. The subsequent distillation of the residual mixture under reduced pressure gave the following fractions:

| Fractions | Boiling point | Yield | N,N-dimethyl-acetamide content (by weight) |
|---|---|---|---|
| $F_1$ | 100° to 106°C./90mm Hg | 0.9 g. | 67.0% |
| $F_2$ | 106° to 109°C./85mm Hg | 27.9 g. | 95.7% |
| $F_3$ | 109° to 125°C./85mm Hg | 19.5 g. | 68.0% |
| $F_4$ | 125° to 157°C./80mm Hg | 28.0 g. | 0% |
| Residue of distillation | | 8.5 g. | |

The fraction $F_1$ contained water, and the fractions $F_2$ and $F_3$ contained 4.3 percent and 19.5 percent by weight of acetic acid, respectively. The fraction $F_4$ was a mixture of N-methylacetamide and acetamide. From all the fractions, 40.2 g. of N,N-dimethylacetamide were obtained (the yield based on the amount of acetic acid was 46.2 percent. The amount of the acetic acid remaining unreacted was 5.1 g. (8.5 percent based on the charged amount).

For the purpose of comparison, 77.0 g. of ammonium acetate, 68.0 g. of methanol and 2.5 g. of stannic chloride were charged into an autoclave having a capacity of 300 ml. and, after replacement of the air in the autoclave by nitrogen, the charged mixture were heated at 340° C. for two hours. After cooling to room temperature, the autoclave was opened. The resulting reaction mixture was subjected to distillation to yield the following fractions:

| Fractions | Boiling point | Yield | N,N-dimethyl-acetamide content |
|---|---|---|---|
| $F_1'$ | 55° to 105°C./90mm Hg | 20.5 g. | 4.4% |
| $F_2'$ | 105° to 107°C./85mm Hg | 11.3 g. | 45.6% |
| $F_3'$ | 107° to 130°C./85mm Hg | 38.5 g. | 78.5% |
| $F_4'$ | | | |
| Residue of distillation | | 9.4 g. | |

The fraction $F_1'$ contained a large amount of water and, the fractions $F_2'$ and $F_3'$ contained 54.4 percent and 19.8 percent by weight of acetic acid, respectively. From all the fractions, 36.3 g. of N,N-dimethylacetamide were obtained (the yield based on the amount of acetic acid was 41.7 percent). The amount of the acetic acid remaining unreacted was 13.8 g. (23.0 percent based on the charged amount was 23.0 percent).

EXAMPLE 13

The same operation as described in Example 3 was repeated with exception that 39.5 g. of a fraction consisting mainly of water were removed from the fractions of the reaction mixture having boiling points lower than that of N,N-dimethylacetamide produced in the first reaction. As a result, 39.9 g. of N,N-dimethylacetamide were obtained in the second reaction (the yield based of the amount of the charged acetic acid was 91.7 percent). At the same time, 2.1 g. of unreacted acetic acid were recovered (7 percent based on the amount of the charged acetic acid). (Thus, the yield based on the consumed acetic acid was 98.6 percent.) The rate of the remain of unreacted acetic acid was reduced by 18 percent based on the amount of the charged acetic acid, and the one-pass yield of N,N-dimethylacetamide was increased by 18.2 percent.

What is claimed is:

1. A process for the preparation of aliphatic tertiary amides which comprises reacting a fatty acid represented by the general formula $R^1COOH$ wherein $R^1$ is a hydrogen atom or an alkyl group having one to six carbon atoms and ammonia directly with an alcohol represented by the general formula $R^2OH$ wherein $R^2$ is an alkyl group having 1 to 4 carbon atoms in the presence of a catalyst selected from the group consisting of inorganic acid salts and organic acid salts of copper, zinc, cadmium, mercury, titanium, zirconium, tin, vanadium, antimony, bismuth, chromium, manganese, iron, cobalt, nickel, ruthenium, rhodium and palladium and mixtures thereof, at a temperature of 100° C. to 800° C. under pressure, said ammonia and alcohol being employed in amounts of 0.8 to five moles and 1.5 to ten moles per mole of fatty acid, respectively.

2. A process as claimed in claim 1, wherein said inorganic acid salts include the salts of carbonic acid, hydrogen cyanide, nitric acid, sulfuric acid, hydrogen halide, phosphoric acid, pyrophosphoric acid, boric acid, nitrous acid, sulfurous acid, phosphorous acid, thiocyanic acid, and hydrogen oxyhalides.

3. A process as claimed in claim 1, wherein said organic acid salts include the salts of formic acid, acetic acid, propionic acid, butyric acid, stearic acid oxalic acid, citric acid, p-toluenesulfonic acid, picric acid, naphthenic acid, benzoic acid and toluic acid.

4. A process as described in claim 1 wherein said catalyst is employed in an amount of 0.0001 to ten mole percent based on the amount of fatty acid.

5. A process as claimed in claim 1 wherein at least a part of the starting materials remaining unreacted are recycled to the starting reaction mixture.

6. A process as claimed in claim 1 wherein water is removed from the reaction system.

7. The process of claim 1 wherein at least a part of any by-products formed are recycled to the starting reaction mixture.

* * * * *